United States Patent
Filhol

[15] 3,688,137
[45] Aug. 29, 1972

[54] OPEN ELECTRIC MACHINE FOR OPERATING IN AN AGGRESSIVE MEDIUM

[72] Inventor: Jean Filhol, Nantes, France

[73] Assignee: Etablissements Brissonneau et Lotz, Paris, France

[22] Filed: May 3, 1971

[21] Appl. No.: 139,388

[30] Foreign Application Priority Data

May 5, 1970 France.....................7016414

[52] U.S. Cl.....................................310/43, 310/45
[51] Int. Cl................................................H02k 1/04
[58] Field of Search........310/67, 43, 45, 86, 87, 258; 29/605; 264/272

[56] References Cited

UNITED STATES PATENTS

| | | | |
|---|---|---|---|
| 3,374,534 | 10/1929 | Kuska | 310/43 |
| 2,975,309 | 3/1961 | Seidner | 310/43 |
| 3,436,811 | 4/1969 | Dundas | 310/43 |
| 2,989,657 | 6/1961 | Sampson | 310/45 |
| 3,194,993 | 7/1965 | Hackney | 310/43 |
| 3,155,856 | 11/1964 | Macha | 310/43 |
| 2,761,985 | 9/1956 | Schaffer | 310/45 |

Primary Examiner—J. D. Miller
Assistant Examiner—R. Skudy
Attorney—John Lezdey

[57] ABSTRACT

An open electric machine having a stator protected from the aggressive medium by protective means including a coating in which the loops of the stator winding are embedded and constituted by a solvent-free resin containing a filler and having good heat conductivity, a bonding and heat insulating sheath on the coating and on the bore of the stator laminations and constituted by a homogeneous plastics material containing a filler and having a coefficient of thermal expansion in the neighborhood of that of the stator laminations. A fluidtight covering on the sheath and composed of a polyamide-base material radially in contact with the end walls of the machine frame.

14 Claims, 1 Drawing Figure

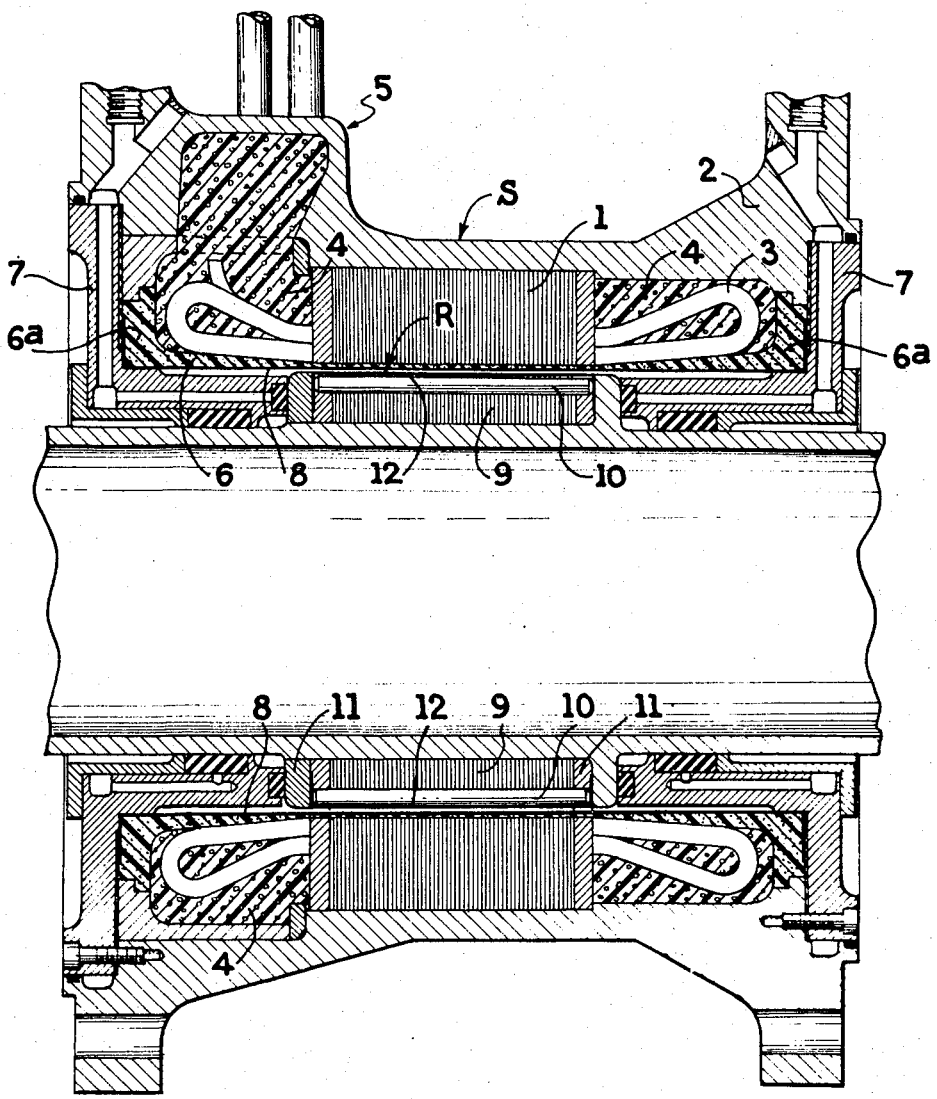

OPEN ELECTRIC MACHINE FOR OPERATING IN AN AGGRESSIVE MEDIUM

The present invention relates in a general way to electric machines of the open type intended to operate in a fluid medium or in a corrosive atmosphere.

Such machines can be employed for immersed pumps, for driving and propelling ships. For example, they can serve as stem motors, motors for driving faired propellers, or as motors for driving immersed winches or auxiliary equipment of a vessel (control or positioning motor).

It will be understood that the machines according to the invention can be driving machines or generating machines and can be employed as a generator or an alternator.

In such applications, the conditions of operation may vary over wide ranges, for example the pressure may vary from 0 to 200 bars and the temperature may be between $-50°$ and $+200°$ C.

At the present time machines of this type are in great demand in various fields such as petrol and mining fields, caissons and immersed bells, wet submarines.

The fluid surrounding the machine can also be of any type, for example it may be necessary to employ these electric machines in water having various degrees of pollution and corrosive properties, in sea water, in corrosive chemical fluids, or in abrasive muds.

Up to the present time these electric machines have been constructed in two different ways:

1. The machine is fluidtight and filled with an internal non-corrosive fluid such as oil or clean water.

Seals or stuffing boxes seal off the inner cavity of the machine from the outer surrounding fluid. The balancing of the pressures (internal and external) is usually achieved by means of an elastically yieldable diaphragm. In this case, difficulties might be encountered to ensure a good sealing of the machine over a period of time to preclude possible entry of the surrounding fluid in the machine, which of course leads to a destruction of its active parts. Further, mechanical or thermal effects may deteriorate the internal fluid and the diaphragm balancing the internal and external pressures. The deterioration of this fluid (degasification, deposits, increase in the acid contents) also results in a more or less rapid destruction of the insulation.

2. The machine is open and has metal airgap sleeves (for the stator and/or rotor) and is immersed in the surrounding fluid. The metal sleeve or sleeves then seal and protect the active parts of the machine, that is, the laminations and winding.

This arrangement also has drawbacks. Indeed, the airgap sleeve, in particular of the stator, results in large Joulean losses which are proportional to the diameter of the stator bore and inversely proportional to the length of the laminations and to the resistivity of the sleeve. It is therefore necessary to limit the length and diameter of the machines and employ preferably sleeves having a high resistivity such as sleeves composed of metal known under the names of "Hastelloy", "Inconel", or sleeves composed of titanium. Further, such machines are expensive to make since the sleeve must be positioned in a very precise manner by welding or other means. Lastly, the metal sheaths are very sensitive to abrasion.

The object of the present invention is to remedy the drawbacks of the arrangements heretofore suggested in this field.

The invention provides an electric machine of the open type intended to operate in particular in an aggressive medium, wherein the stator is protected from the aggressive medium by protecting means comprising: (a) a coating in which are embedded the loops of the stator winding, said coating being constituted by a solvent-free resin containing a particle or fiber filler having a good heat conductivity, (b) a connecting and heat insulating sheath applied to said coating and to the inner bore of the laminations of the stator, said sheath being constituted by a homogeneous plastics material containing a particle or fiber filler and whose coefficient of thermal expansion is in the neighborhood of that of the laminations of the stator, and (c) a fluidtight covering on top of said sheath and composed of a polyamide-base material radially in contact with the end walls of the frame.

Further features and advantages of the invention will be apparent from the ensuing description with reference to the accompanying drawing.

In the drawing:

The FIGURE is an axial sectional view of an electric machine according to one embodiment of the invention.

The stator S of the machine comprises laminations or plates 1 mounted or embedded in a frame 2 whose outer part can be in direct contact with the surrounding aggressive medium. Conduits (not shown) may pass through the frame and convey a cooling liquid. In order to avoid any degasification in the course of the subsequent stages of manufacture, the laminations 1 and frame 2 are impregnated in a vacuum with a solvent-free thermosetting fluid resin which resists relatively high temperatures. This resin must be appropriate to the thermal class of the machine and compatible with the insulations of the winding. This resin can be advantageously a polyester resin, an epoxy resin, a silicone resin or a polyimide resin.

A winding 3 is mounted in the laminations in a conventional manner. Once in position this winding is also coated in a vacuum with a solvent-free resin which is for example of the same type as that employed for coating the frame and laminations.

The loops of the winding 3 are embedded in a coating 4 which acts as a support therefor and is constituted by a solvent-free resin which may be advantageously a polyester resin, an epoxy resin, a silicone resin or a polyimide resin. This coating 4 contains a filler affording sufficient heat conductivity to permit the dissipation of the heat generated in operation of the machine.

In view of the shape of the loops to be coated, it is unnecessary that the filler be distributed in an absolutely homogeneous manner throughout the coating.

The filler is in crude form and in particular in the form of powder, sand, balls or granules. In these cases, the material of the filler can be advantageously quartz, silica, magnesium oxide, talc, alumina, beryllium oxide, copper or aluminum, the copper and aluminum being employed preferably in the powdered form.

The coating can also have a fabric or fiber filler which can be advantageously produced from mica, asbestos, glass or polyester or polyamide resin.

As can be seen in the FIGURE, the coating 4 also extends into a connection box 5 which is thus rendered perfectly sealed.

A sheath 6 is applied on the coating 4 and the stack of stator laminations 1. It terminates on each side of the block formed by the coating in end walls 6a which are connected to the metal end walls 7 integral with the frame 2. This sheath has a double purpose: it serves as a connecting or bonding element between the coating 4 and a covering 8 which is applied thereon and as heat insulating means on application of the covering 8 which is formed in the manner described hereinafter at very high temperature. The sheath 6 thus protects the winding from this high temperature.

The sheath 6 is composed of a homogeneous plastics material advantageously comprising a phenoplast resin, a polyester resin, an epoxy resin, a silicone resin or a polyimide resin. It contains for example a finely-divided filler advantageously constituted by silica, carbon, borium, or alumina or by a polyester or polyamide resin. The filler can also be in the form of glass or asbestos fabric or fibers, in which cases it is preferred to employ a glass-epoxy stratified structure containing in particular 30 to 90 percent of glass with respect to the weight of the stratified structure.

In any case, it is arranged that the coefficient of expansion of the plastics and filler sheath be as near as possible to that of the laminations 1 of the stator.

The sheath can be made prior or subsequent to the application of the coating 4. In the first case, the sheath acts as a mould for the coating and in the second case it is applied on the coating 4, for example by any one of the following methods: pressure moulding by transfer or contact, winding filamentary material, winding resin-impregnated fabric, or any other method of this type.

The main features and functions of the sheath 6 are the following:

It affords a homogeneous mechanical and continuous support or base for the sealing covering subsequently applied thereon; it affords a thermal protection of the active parts of the stator when applying — possibly in the hot state — the sealing covering; it has physical and chemical properties compatible with:

the various component materials of the stator (winding, resins, laminations, frame);
the sealing covering 8 subsequently applied thereon.

Once in position, the insulating sheath can be if desired machined by turning, polishing, grinding or like operations and suitably prepared for receiving the covering 8.

The covering 8 is applied directly to the sheath 6 both in the bore and on a part of the end walls of the sheath. The choice of the material employed depends on the conditions of operation of the machine and on the nature of the surrounding aggressive medium, that is, its chemical nature, its corrosive and abrasive actions and the thermal and mechanical conditions.

The covering is afforded by a polyamide-base material, for example Polyamide 11 (known under the trade name "RILSAN"), polyamide-base copolymers or composite plastics materials such as, for example, a layer of polyamide acting as a connecting or bonding layer on which is applied a second layer of polyolefins, preferably polyethylene, which afford a good resistance to the aggressive agents of the surrounding medium.

The covering can be applied for example by a transfer or contact compression moulding process, a fluidization process, application by means of a flame gun or blowpipe, electrostatic or electromechanical electrocoating, or a process of adhering sheets of plastics material.

After application, the covering can be machined without affecting its sealing quantities, after which the covering has a thickness of no more than about 1.5 mm.

The rotor R of the machine can be in the conventional form of a squirrel cage (that is for cage-type asynchronous machines) or provided with a winding whose design is very similar to that of the stator winding in the known manner.

There has been shown in the FIGURE the case of a squirrel cage rotor having laminations 9 and bars 10 soldered to short-circuiting rings 11. In this case, it is provided solely with a covering 12 whose nature and manner of application are similar to those which pertain to the stator S.

In the case of a wound rotor, a coating similar to the coating of the stator 4 is produced, a connecting and protecting sheath very similar to the sheath 6 of the stator S is provided, and finally the whole is covered so as to obtain a covering also similar to the covering 8 of the stator S.

As these three elements have already been described in detail with reference to the stator S, no detailed description thereof is needed here.

EXAMPLE

This example illustrates the construction of a cage-type asynchronous motor intended to operate immersed in sea water.

The treatment of the stator part and of the rotor part will be described separately:

a. Stator Part

The laminations-frame unit of the motor, is first impregnated in a vacuum with a pressurized solvent-free epoxy varnish having high thermal characteristics (resin CY 205 associated with a hardener HY 906, both of which products are sold by the Company CIBA). The winding, once in position, is impregnated in a vacuum with a pressurized solvent-free epoxy resin (resin CY 205 associated with a hardener HY 905).

The loops are then coated by means of a solvent-free epoxy resin (resin CY 205 + hardener HY 905) having a filler including glass fabric, silica and glass balls, the filler representing 70 percent of the total weight of resin and filler.

There is then applied on the coating an insulating sheath constituted by an epoxy-glass stratified structure (50 percent of glass by weight) having high thermal characteristics (200° C) in the form of a tubular stratified structure which is machined and surface finished.

There is applied on the insulating sheath thus prepared, a covering of "RILSAN" produced in the hot state (190°–200° C) by a projection of powder by means of a flame gun and electrostatic gun.

The covering is then machined in the cold state to a thickness of 0.5–1 mm according to requirements.

b. Rotor Part

The unit, comprising the laminations, the cage and rings, is impregnated in the same way as the stator S with the same solvent-free epoxy varnish.

After preparation of the surface state of the rotor, there is applied thereon a covering of "RILSIN" in the hot state produced by the projection of a powder by means of an electrostatic gun and a flame gun.

The "RILSAN" covering is then machined in the cold state in the manner indicated in respect of the stator part.

Having now described my invention what I claim and desire to secure by Letters Patent is:

1. An open electric machine intended in particular to operate in an aggressive medium, comprising a frame having end walls, a stator having laminations and winding portions extending out of said laminations, means defining a bore in said stator laminations, a rotor rotatable in said bore and means for protecting said stator from said aggressive medium comprising: (a) a coating in which are embedded said winding end portions, said coating being constituted by a solvent-free resin containing a filler and having a good heat conductivity, (b) a connecting and heat insulating sheath on said coating and on said bore of the laminations of the stator, said sheath being constituted by a homogeneous plastics material containing a filler and having a coefficient of thermal expansion in the neighborhood of the coefficient of expansion of the laminations of the stator, and (c) a fluidtight covering on said sheath and composed of a polyamide-base material and radially in contact with said end walls of the frame, said covering being composed of a material selected from the group consisting of polyamide and a polyamide-base copolymer.

2. A machine as claimed in claim 1, wherein the laminations, frame and winding of the stator and electrical parts of the rotor are impregnated with a heat resistant solvent-free resin.

3. A machine as claimed in claim 2, wherein said resin is selected from the group consisting of a polyester resin, an epoxy resin, a silicone resin, and a polyimide resin.

4. An open electric machine intended in particular to operate in an aggressive medium, comprising a frame having end walls, a stator having laminations and winding portions extending out of said laminations, means defining a bore in said stator laminations, a rotor rotatable in said bore and means for protecting said stator from said aggressive medium comprising: (a) a coating in which are embedded said winding end portions, said coating being constituted by a solvent-free resin containing a filler and having a good heat conductivity, (b) a connecting and heat insulating sheath on said coating and on said bore of the laminations of the stator, said sheath being constituted by a homogeneous plastics material containing a filler and having a coefficient of thermal expansion in the neighborhood of the coefficient of expansion of the laminations of the stator, and (c) a fluidtight covering on said sheath and composed of a polyamide-base material and radially in contact with said end walls of the frame, said covering comprising an undercoat of polyamide resin on said sheath and a protective coat of polyolefin on said undercoat.

5. A machine as claimed in claim 1, wherein said covering has a thickness less than about 1.5 mm.

6. A machine as claimed in claim 4, wherein said covering has a thickness less than about 1.5 mm.

7. A machine as claimed in claim 4, wherein the laminations, frame and winding of the stator and electrical parts of the rotor are impregnated with a heat-resistant solvent-free resin.

8. A machine as claimed in claim 7, wherein said resin is selected from the group consisting of a polyester resin, an epoxy resin, a silicone resin, and a polyimide resin.

9. An open electric machine intended in particular to operate in an aggressive medium, comprising a frame having end walls, a stator having laminations and winding portions extending out of said laminations, means defining a bore in said stator laminations, a rotor rotatable in said bore and means for protecting said stator from said aggressive medium comprising: (a) a coating in which are embedded said winding end portions, said coating being constituted by a solvent-free resin containing a filler and having a good heat conductivity, (b) a connecting and heat insulating sheath on said coating and on said bore of the laminations of the stator, said sheath being constituted by a homogeneous plastics material containing a filler and having a coefficient of thermal expansion in the neighborhood of the coefficient of expansion of the laminations of the stator, and (c) a fluidtight covering on said sheath and composed of a polyamide-base material and radially in contact with said end walls of the frame, said rotor being a squirrel cage rotor having laminations and bars which are protected against the aggressive medium by a fluidtight covering composed of a polyamide-base material.

10. A machine as claimed in claim 9, wherein the laminations, frame and winding of the stator and electrical parts of the rotor are impregnated with a heat-resistant solvent-free resin.

11. A machine as claimed in claim 10, wherein said resin is selected from the group consisting of a polyester resin, an epoxy resin, a silicone resin, and a polyimide resin.

12. An open electric machine intended in particular to operate in an aggressive medium, comprising a frame having end walls, a stator having laminations and winding portions extending out of said laminations, means defining a bore in said stator laminations, a rotor rotatable in said bore and means for protecting said stator from said aggressive medium comprising: (a) a coating in which are embedded said winding end portions, said coating being constituted by a solvent-free resin containing a filler and having a good heat conductivity, (b) a connecting and heat insulating sheath on said coating and on said bore of the laminations of the stator, said sheath being constituted by a homogeneous plastics material containing a filler and having a coefficient of thermal expansion in the neighborhood of the coefficient of expansion of the laminations of the stator, and (c) a fluidtight covering on said sheath and composed of a polyamide-base material and radially in contact with said end walls of the frame, the rotor being of the wound type and protected by protecting means composed of a polyamide-base material.

13. A machine as claimed in claim 12, wherein the laminations, frame and winding of the stator and electrical parts of the rotor are impregnated with a heat-resistant solvent-free resin.

14. A machine as claimed in claim 13, wherein said resin is selected from the group consisting of a polyester resin, an epoxy resin, a silicone resin, and a polyimide resin.

* * * * *